C. STRAND.
MOTOR DRIVEN ASSEMBLING TOOL.
APPLICATION FILED MAY 9, 1919.
1,384,811.
Patented July 19, 1921.
3 SHEETS—SHEET 2.
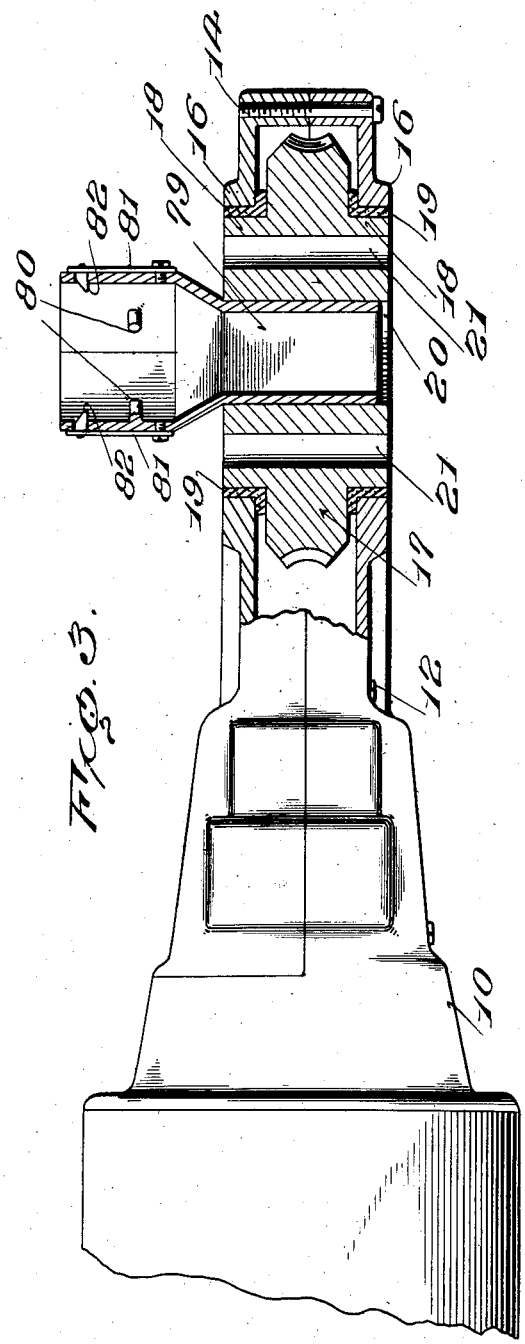
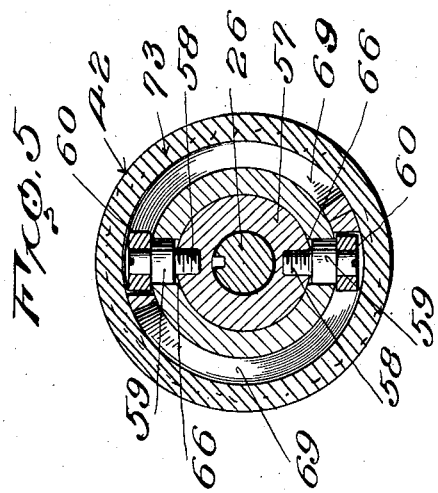
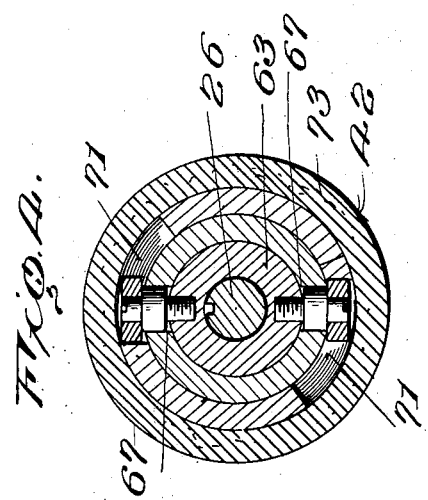
Inventor
C. Strand C. STRAND.
MOTOR DRIVEN ASSEMBLING TOOL.
APPLICATION FILED MAY 9, 1919.
1,384,811.
Patented July 19, 1921.
3 SHEETS—SHEET 3.
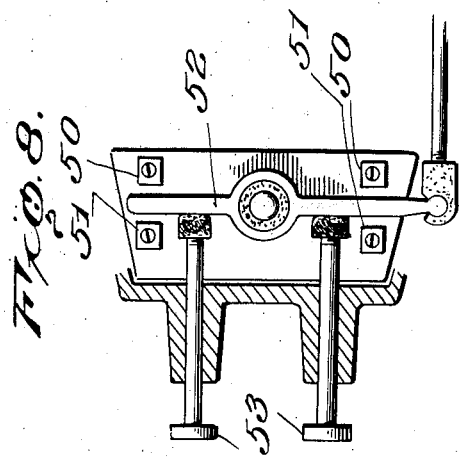
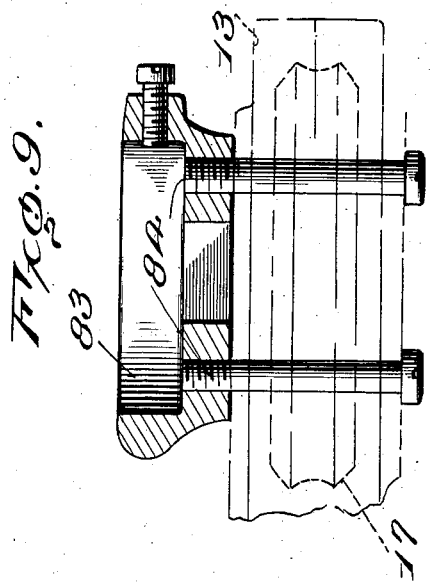
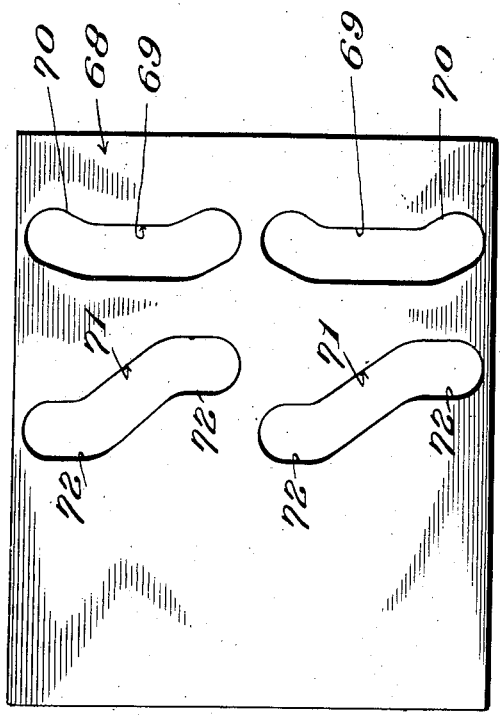
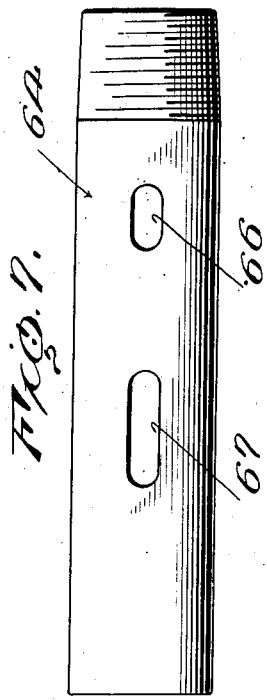
Inventor
C. Strand
By Chandler & Chandler
Attorneys.

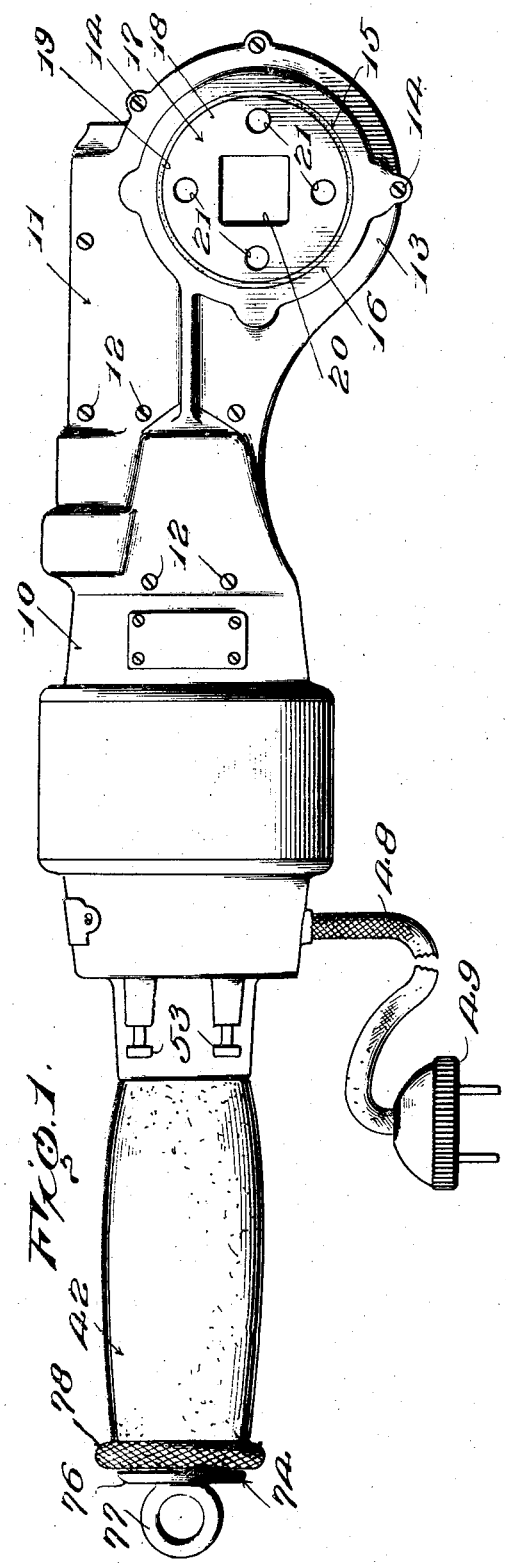

UNITED STATES PATENT OFFICE.

CLARENCE STRAND, OF GARY, MINNESOTA.

MOTOR-DRIVEN ASSEMBLING-TOOL.

1,384,811.  Specification of Letters Patent.  Patented July 19, 1921.

Application filed May 9, 1919. Serial No. 296,042.

*To all whom it may concern:*

Be it known that I, CLARENCE STRAND, a citizen of the United States, residing at Gary, in the county of Norman, State of Minnesota, have invented certain new and useful Improvements in Motor-Driven Assembling-Tools; and I do hereby declare the following to be a full, clear, and exact description of the invention, such as will enable others skilled in the art to which it appertains to make and use the same.

This invention relates to tools and more particularly to an improved motor driven tool or appliance designed to permit various assembling or other operations to be quickly and efficiently carried out by means of motor power instead of by the slow and laborious method of employing hand power.

The invention further embodies an improved motor driven tool, preferably operated by means of an electric motor designed for connection with a switch plug and which includes a casing housing the motor and operative connections or drive parts associated with the motor so that a rotatable wrench head in the form of a worm gear provided with a socket and adapted for operative connection with various forms of appliances to be operated may be driven at different speeds and in different directions and maintained under control at all times, the device being one which is portable so as to be carried about the same as an ordinary tool designed to be operated by hand instead of by motive power as per the present invention, while the tool is so constructed as to provide for rigidity as well as gracefulness in design obviating sharp corners or projections that would be likely to catch in the clothing or injure the operator and possessing other particular and distinct advantages as will be more clearly set forth hereinafter.

The further object of the invention is to provide an improved motor driven assembling tool which comprises a housing in which is rotatingly mounted at one end, a worm gear equipped to be coupled to various appliances for operating accessible and comparatively inaccessible parts, tightening and loosening nuts and cap screws and carrying on various other operations requiring the application of continuous rotary movement whereby to permit the driving or operation of multitudinous apparatus or machines otherwise driven by hand or special stationary individual motors, the housing also inclosing in position to properly balance the tool, a motor driven with suitable energy or source of power and capable of being brought into operative connection with the worm gear at will so that the latter may be driven at different speeds or in reversed directions from a handle produced at the opposite end of the housing and through which the motor and drive connections are constantly under control so that accuracy in carrying out the work is at all times possible.

A still further object of the invention is to provide a motor driven assembling tool for the general purpose stated which is equipped with an electric motor housed within and forming a part of the tool and capable of control from the handle of the tool by which the device is carried about for application to the work as desired, the controlling means being designed to impart reverse rotation to the motor and including operative connections adapted to clutch the motor to a drive shaft operatively geared to the worm gear so that the latter is stationary and the gearing neutral when the shift in the drive from one speed to another or in reversing the direction of the parts, is carried out, novel means for holding the drive shaft stationary during the interval of disengagement of the clutch elements, being provided, while means is also provided to obviate the necessity of stopping the motor and operation of the device, so as to leave the tool running without holding the handle so that other work may be attended to or preparation made to carry out the work at hand.

With the above objects and others in view as will appear as the specification proceeds, the invention comprises certain novel combinations and arrangements of parts as will be hereinafter more particularly pointed out and claimed.

Reference is had to the accompanying drawings forming a part of this application, wherein like characters indicate corresponding parts throughout the several views, in which—

Figure 1 is an elevational view of my improved motor driven assembling tool;

Fig. 2 is a central longitudinal sectional view thereof, the clutch being shown in disengaged position;

Fig. 3 is a similar view at right angles to

Fig. 2, taken on the section line 3—3 of Fig. 2;

Fig. 4 is a transverse sectional view on the line 4—4 of Fig. 2;

Fig. 5 is a sectional view taken on the line 5—5 of Fig. 2;

Fig. 6 is a diagrammatic view showing the layout of an extension bushing forming a part of the gear shifting and clutch operating mechanism of the device;

Fig. 7 is an elevation of a sleeve coöperating with the bushing extension shown in Fig. 6;

Fig. 8 is a detailed sectional elevation showing the push button switch for controlling the operation of the motor, and Fig. 9 is a detailed sectional view showing the use of the openings in the worm gear for coupling a die holder or the like thereto, as distinguished from the use of the socket shown in Fig. 3.

Referring to the drawings in detail, wherein is illustrated the preferred embodiment of my invention, the improved motor driven assembling tool is shown as embodying a casing or housing 10 provided at its forward end with a removable plate or cap 11 secured thereto in any suitable manner as by screws 12 and having an offset circular extension 13 comprising opposed plates suitably secured together as indicated at 14 and having circular openings 15 disposed in alinement or registration at the opposite sides of the casing, said plates having flanges 16 designed to rotatably retain the operating head, in the form of a worm gear 17, therein. The worm gear is shown provided with oppositely extending flanges 18 coöperating with the flanges 16 serving to retain the gear in position, there being provided between the respective flanges, interposed bushings 19 so that the gear may turn freely in its bearings. The worm gear is also shown provided with a socket 20 and a series of openings 21 preferably four in number, by which the device may be coupled to various forms of tool appliances, although I desire to have it understood that any improved or desired form of coupling means may be employed for connecting the device to the various machines or parts to be operated or driven.

As illustrated, the axis of the worm gear is offset with respect to the longitudinal axis of the tool and disposed at right angles with respect thereto, the housing 10 carrying intermediately, a motor including a field coil or stator 22 and an armature or rotor 23 designed to be operated and controlled as will hereinafter be more clearly set forth. The housing 10 is further provided with a web 24 and a bearing extension 25, forming bearings for a drive shaft 26 extending longitudinally and axially of the housing or casing, with suitable bushings provided in the webs 24 and 25 to permit rotation of the shaft without undue friction. These webs are positioned between the motor and the worm gear constituting the working head of the tool and they further form bearings for a driven shaft 27 positioned parallel to shaft 26, the forward end of the shaft 26 terminating in front of the bearing 25, while the rear end of the shaft 27 terminates adjacent to the bearing 24, the shafts thus overlying one another and the shaft 27 being journaled at its forward end in bearings 28 and provided intermediately thereof with a worm thread 29 in engagement with the worm gear 17. Fixed to the shaft 26 in adjacent relation and disposed in contact one with another is a small pinion 30 and a large pinion 31 and affixed to the shaft 27 in spaced relation sufficiently to accommodate one of the pinions 30 or 31 therebetween, is a large pinion 32 and a smaller pinion 33 with which the pinions 30 and 31 are respectively designed to mesh at different times.

The motor includes a hub 34 which is engaged on the shaft 26 and has a thickened portion 35 thereof disposed between the rotor and the bearing 24, there being provided interposed take-up collars 36 forming thrust bearings for the rotor and its hub. The opposite end of the hub has secured thereon, preferably detachably, as through the medium of a threaded connection 37, a conical shell 38 constituting the outer element of a clutch device or mechanism which further includes a coöperating and interfitting cone 39 also engaged on the shaft 26 through the medium of its sleeve portion 40 which is rotatably mounted within the hollow shank portion 41 of the housing adjacent to the attachment of the handle of the device generally designated at 42. The cone 39 is tapered in opposite directions and is designed to be received within a cup-shaped recess 43 in a forward extension of the shank portion 41 of the housing or casing in order to lock the cone and its sleeve portion 40 and consequently the shaft 26 operatively connected thereto in a manner which will be more fully described, to prevent the shaft from turning when the gears are shifted as will also be fully described. The clutch members are normally held disengaged with the cone disposed in the recess 43, through the medium of an expansible coiled spring 44 which is seated in an internal recess in the cone and is disposed around the shaft 26, one end of the spring engaging a washer 45 abutting the adjacent end of the hub 34 within the cone shaped recess of the shell disk 38 constituting the coöperative member of the clutch by which the shaft and the motor are operatively connected or separated. It is of course to be understood that the housing or casing 10 may be made of any suitable number of parts joined together in any desired fashion within suitable openings rendering the interior mechanism accessible for lubrication, repair or adjusting. Furthermore, in front of the web 24 lubrication may be disposed within the housing so as to thoroughly lubricate all of the gears employed in the construction as will no doubt be found a distinct advantage in the maintenance of the device in good order. A grease cup 46 is provided, the same having a duct 47 leading to the interior of the hub or sleeve 34, to lubricate the motor bearing around the axle 26.

The motor is provided with a means of current supply in the form of an extension cord 48 having a suitable plug 49 adapted for connection in a socket of the usual type whereby through the medium of suitable length of extension cord containing the usual conductors, the device may be used in various places otherwise inaccessible, or wherever such current supply may be had.

In order to control the operation of the motor, there is interposed in the circuit between the conductors and the motor, a switch more clearly designated in Fig. 8 of the drawings, the switch comprising the opposed pairs of contacts 50 and 51 which are stationary and adapted to be engaged by a pivoted contact bar 52 so as to connect diagonally opposite contacts for reversing the direction of operation of the motor. The contact bar is designed to be operated by independent buttons 53 the shank portions of which contact with the bar at opposite sides of its pivot so that the bar may be shifted or oscillated in opposite directions with a snap motion so that the bar or knife will be locked in either contact position or in an intermediate position, when the motor is electrically disconnected.

As previously stated, the spring 44 serves to hold the cone 39 in the recess 43 so as to bind the cone and prevent the shaft 26 from turning, it being understood that the sleeve portion 40 of the cone is keyed to the shaft 26 as indicated at 54. The shaft 26 is splined for this purpose and the sleeve 40 is made up of two sections having interlocking faces 55 forming jaws as of a clutch to operatively connect the parts and facilitate assemblage, the sleeve being designed to turn within the extension 41 of the clutch and switch housing at the end of the motor remote from the gearing, the motor being so positioned relative to the remaining parts of the device as to give a proper balance which will greatly facilitate the use of the tool. At the portion of the sleeve 40 which is splined or keyed to the shaft 26, it is enlarged as shown at 56 while loose on the shaft and abutting said enlargement is a set collar 57 in diametrically opposite sides of which are engaged screws 58 which project outwardly and are formed with enlargements 59 outwardly of which rollers 60 are mounted to turn on said screws. Also fixed to the shaft 56 are a pair of spaced set collars 61, the same being held from turning on the shaft by means of set screws 62, while positioned between the collars and likewise loose on the shaft is an intermediate collar 63 carrying screws and rollers corresponding to the parts 58, 59, and 60 carried by the collar 57 and similarly positioned. The shank portion 41 is interiorly hollowed out and threaded for engagement by the exteriorly threaded end of an internal sleeve 64 as indicated at 65, said sleeve having diametrically opposed pairs of slots 66 and 67 therethrough. The slots 66 are shorter than the slots 67 and receive the screws 58 therethrough, while the screws carried by the collar 63 are engaged in the slots 67 so that the enlargements 59 will be disposed within the slots, while the rollers will be disposed in a circular plane outwardly of the sleeve 65.

Mounted to turn on the sleeve 64 is an outer sleeve 68 which is preferably stamped from sheet metal of proper dimensions and thickness and then folded and joined at the edges thereof by welding or otherwise, or otherwise produced to provide a pair of circumferentially extending slots 69 having the end portions thereof directed forwardly as indicated at 70, while rearwardly of the slots 69 are disposed diagonally extending slots 71 with the ends thereof extending circumferentially and at right angles to the axis as indicated at 72. The slots 69 receive the rollers of the screws 58 carried by the collar 57, while the slots 71 receive the rollers carried by the collar 63 so that upon turning the sleeve 68, translatory movement will be imparted to the shaft 26 and then the clutch sleeve 40 to shift the same axially in a required direction after shifting the gears 30 and 31 with respect to the gears 32 and 33 for driving the worm gear 17 and thus the working head formed by the disk thereof, at different speeds or to throw said drive mechanism out of operation depending upon whether the clutch members 38 and 39 are engaged or disengaged. The outer sleeve 68 is provided with a handle grip 73 also in the form of a shell or sleeve which also serves to inclose the openings and screws carried by the inner and outer sleeves 64 and 68 respectively. It should also be noted that the outer sleeve and its band grip are disposed to aline with the housing extension 41 forming the shank of the tool and thereby it is necessary to retain the outer sleeve in position on the inner sleeve in conjunction with the screws and rollers which latter also permit free movement or rotation of the outer sleeve in effecting the shifting of the shaft 26 and the clutch sleeve for throwing the parts into and out of operation as described. This is accomplished by means of a cap nut 74 having an externally threaded extension engaging internal threads of the inner sleeve 64 as shown at 75 and provided with a flange 76 which prevents longitudinal movement or translation of the outer sleeve on the inner sleeve. This nut is further provided with a ring 77 by means of which the tool may be suspended from a hook, nail or the like when not in use.

Furthermore, in order to lock the handle against movement, or rather the outer sleeve, so as to prevent shifting or turning of the outer sleeve and thus prevent the release of the clutch under the action of the spring 44 when the operator wishes to leave the tool running without holding the handle in position with his hands, a knurled washer or bushing 78 is provided, the same being interposed with respect to the handle cap and shells or sleeves. This washer or bushing is fitted loosely and threaded on the external surface of the inner sleeve 64 so that when it is turned to bind the adjacent ends of the sleeves, the outer sleeve will be held from turning but when the device is not in use, it is turned against the flange 76 of the handle cap or nut 74 so as to permit the outer sleeve 68 to be freely turned for the purpose already described.

In illustrating the use of the device and particularly of the socket 20 and openings 21 in the worm gear or disk 17, there is shown in Fig. 3 of the drawings, a nut socket 79 extended to receive a hexagonal or other form of nut. This nut socket is provided with a shank to engage the square opening or socket 20 and is equipped with studs 80 on the inside walls thereof, said studs serving to keep the nut from slipping up into the socket and further provided with springs 81 attached to the opposite sides of the socket, with projections 82 riveted, to the ends of the springs extending through holes in the socket, said projections forming dogs to engage the nut and prevent it from falling out of the socket. With this device it is possible to pick up a nut and start it in any position or place.

In Fig. 9 of the drawings there is shown a die holder 83 having a plurality of shanks 84 in the form of studs or screws will be passed through the openings 21, and screwed into the threaded openings 85 of the die so as to secure the die holder in position for use.

In the operation of the device, the plug 49 or other suitable form of connector is engaged in its socket and thereby the current is caused to flow to the motor. Normally, the motor will run on the shaft 26 which it surrounds and relative to which it is concentrically located and thus by properly lubricating the motor bearings, there will be no special wear on the parts as the shaft 26 rotates with the motor when the tool is being used. Normally, the spring 44 holds the cone 39 disengaged from the clutch member 38, the sleeve 40 thus being shifted longitudinally by reason of its splined mounting, with respect to the shaft 26 and also a loose fit in the shank portion 41 of the clutch and motor housing, said portion 41 being provided with a tapped socket into which the combination handle, previously described, is removably fitted. In this position the guide pins produced by the screws 58 are engaged in the rear portions of the slots 66 and 67, the cone 39 being seated in the socket 43 and locked by the frictional engagement of the parts thereat. The screws 58 and rollers 60 thereof are engaged in the transverse or intermediate portions of the slots 69 and in the intermediate portions 72 of the slots 71, the portion 72 being transversely positioned and the portions 71 diagonally positioned, and the handle and shell or sleeve 73 and 68 respectively, are turned to the right. Thus, when said parts are turned to the left, the screws and rollers will operate in the slots, thus causing the clutch to be engaged after the shaft 26 is shifted as desired to bring the gear or pinion 31 into engagement with the gear 33. When the shaft 26 is shifted rearwardly the screws 58 will be positioned in the rearmost transverse portions 72 of the slots 71, the gear 31 being disengaged from the gear 33 and the gear 30 being disposed in mesh with the gear 32, thus shifting from high speed to low speed. Of course, the clutch cone 39 will not be shifted when the slots 69 are moving across the path of the screws 58 engaged therein, so that the clutch will be disengaged when the gears are shifted and until they have been brought into mesh, thereby obviating the possibility of scraping or mutilating the teeth of the gears. Thus the cone 39 will only be shifted forwardly by the end portions 70 of the slots 69 and when the screws 58 are engaged in the forward portions 72 of the slots 71, the gear 31 will be disposed in mesh with the gear 33, as originally described. Thus it is only necessary to turn the handle in order to shift the gears and actuate the clutch so as to key the motor to the shaft 26 for driving the operating head formed by the worm gear or gear disk 17 which may be applied to the various work as needed. If a reverse direction of drive is desired, it is only necessary to reverse the position of the tool from one side to the other, both sides being constructed for applying the device to various fittings or accessories to accomplish the varied work to which it will be necessary to apply the device. Also, the direction of rotation of the motor can be controlled by the switch, it only being necessary to repress the button to reverse the direction of rotation of the motor. In this manner, the tool with a few fittings is designed and constructed so that it can be used for tightening and loosening nuts and cap screws, operating bolt taps, dies and reamers, pipe taps and dies, wood augers and iron drills, ratchets, including boiler ratchets and opening and closing gate valves, operating hand driven forge blowers, tire rolls, hand driven drilling machines, disk sharpeners, thread cutting machines, beading machines, crimpers, coffee grinders, meat cutters, roller flue expanders and flue cutters, chain crabs, hoisting crabs and winches, magnet winders, hose and wire reels and in fact all devices which are operated by hand and require continuous rotary motion for any definite period, or such small machines as might possibly be operated by an individual motor or by the ordinary shafting and pulleys as common to a number of machines, common in shops.

What is claimed is:

1. A motor driven assembling tool comprising a housing, a motor in the housing, an operating head rotatable in one end of the housing, gear connections between the motor and the operating head, a handle for the housing at the opposite end thereof, means operated by the handle for shifting the gear mechanism, and means operated by the handle to clutch the motor to the gear operated connections or to disengage the same.

2. A motor driven assembling tool comprising a housing, an operating head rotatably mounted in the housing and having means of connection with various tools, implements or machinery to be operated, a driving shaft slidably and rotatably mounted axially of the housing, a driven shaft rotatably mounted in the housing, operative connections between the driven shaft and the operating head, coöperating speed gearing carried by the shafts, means for driving the drive shaft, a clutch mechanism between the driving shaft and driving means, a handle for the housing projecting rearwardly from the housing and rotatably connected therewith, and means operable from the handle to operate said clutch and move said driving shaft longitudinally.

3. A motor driven assembling tool comprising a housing, an operating head mounted in the housing, and having means of connection with various tools, implements or machinery to be operated, a shaft axially of the housing, operative connections between the shaft and the operating head, shiftable gear connections between the shaft and the operating head for varying the speed of rotation of the latter, a motor in the housing and concentric to the shaft, means for driving the motor, a handle projecting rearwardly from the housing whereby the motor is disposed intermediately of the ends of the tool, a clutch mechanism for connecting the motor to the shaft, said clutch mechanism including a clutch member carried by the motor and a slidable clutch member splined on the shaft, said handle having operative connections with the slidable clutch member for shifting the latter to engage or disengage the clutch member carried by the motor, and means for shifting the shaft while the clutch members are disengaged.

4. A motor driven assembling tool comprising a casing, a worm gear rotatingly mounted in the casing and having means of application to parts to be operated, bearings in the casing, one of which forms a gear housing at one end of the casing, a shaft journaled to the bearings and having a worm engaged with the gear, a second shaft mounted in said bearings axially of the casing and projecting beyond one end thereof, said shaft being slidable longitudinally, coöperative speed changing gears carried by the shafts within the gear housing, an electric motor in the casing and having a rotor mounted on the shaft, said casing having a shank portion, a handle mounted in said shank portion and having a stationary inner sleeve engaged therewith, said inner sleeve having longitudinal slots, a sleeve and a gripping portion rotatable on the inner sleeve, said outer sleeve having a plurality of circumferentially extending slots with oblique portions, a clutch member carried by the rotor, a clutch member splined on the axial shaft for engagement with the first-named clutch member, means normally separating said clutch members, the second clutch member being held against turning whereby the motor can run free of the axial shaft, pins shiftable by the movable clutch member for engagement with certain of said slots and pins mounted loosely on the axial shaft and against sliding thereon, said pins being engaged with others of said slots whereby rotation of the outer sleeve will cause the axial shaft and the movable clutch member to be shifted successively, as and for the purposes specified.

5. A motor driven assembling tool comprising a casing, a worm gear rotatingly mounted in the casing and having means of application to parts to be operated, bearings in the casing, one of which forms a gear housing at one end of the casing, a shaft journaled to the bearings and having a worm engaged with the gear, a second shaft mounted in said bearings axially of the casing and projecting beyond one end thereof, said shaft being slidable longitudinally, coöperative speed changing gears carried by the shafts within the gear housing, an electric motor in the casing and having a rotor mounted on the shaft, said casing having a shank portion, a handle mounted in said shank portion and having a stationary inner sleeve engaged therewith, said inner sleeve having longitudinal slots, a sleeve and a gripping portion rotatable on the inner sleeve, said outer sleeve having a plurality of circumferentially extending slots with oblique portions, a clutch member carried by the rotor, a movable clutch member coöperating with the first-named clutch member and connected to the axial shaft to rotate therewith, a combination handle having means coöperating with the slots, the axial shaft and the movable clutch member for shifting the latter and the shaft, means to prevent rotation of the outer sleeve, and means for controlling the motor.

6. A motor driven assembling tool comprising a housing having a handle movably mounted at one end and an operating head at the other end, a motor in the housing intermediate the handle and operating head, operative connections between the motor and the operating head and including a clutch and a variable speed driving mechanism, and means operated from the movable handle to cause shifting of the drive mechanism and operation of the clutch mechanism to effect a release of the latter prior to the shifting of the drive mechanism.

7. A motor driven assembling tool comprising a casing, a worm gear rotatably mounted in the casing and having means of application to parts to be operated, bearings in the casing, one of which forms a gear housing at one end of the casing, a shaft journaled to the bearings and having a worm engaged with the gear, a second shaft mounted in said bearings axially of the casing and projecting beyond one end thereof, said shaft being slidable longitudinally, coöperative speed changing gears carried by the shafts within the gear housing, an electric motor in the casing and having a rotor mounted on the shaft, said casing having a shank portion, a switch controlling the motor and for reversing the direction of rotation thereof, an extension cord leading from the motor and having a plug for connection with the source of energy, a clutch member carried by the rotor, a movable clutch member coöperating with the first-named clutch member and connected to the axial shaft to rotate therewith, a combination handle comprising an inner sleeve connected to the housing, an outer sleeve rotatable on the inner sleeve and having a gripping portion, means coöperating between the outer sleeve, the axial shaft and the movable clutch member for shifting the latter and the shaft and means to hold said outer sleeve against turning whereby the clutch member and axial shaft can be held in any desired adjusted position.

In testimony whereof, I affix my signature, in the presence of two witnesses.

CLARENCE STRAND.

Witnesses:
O. J. GISKAAS,
B. K. STRAND.